UNITED STATES PATENT OFFICE.

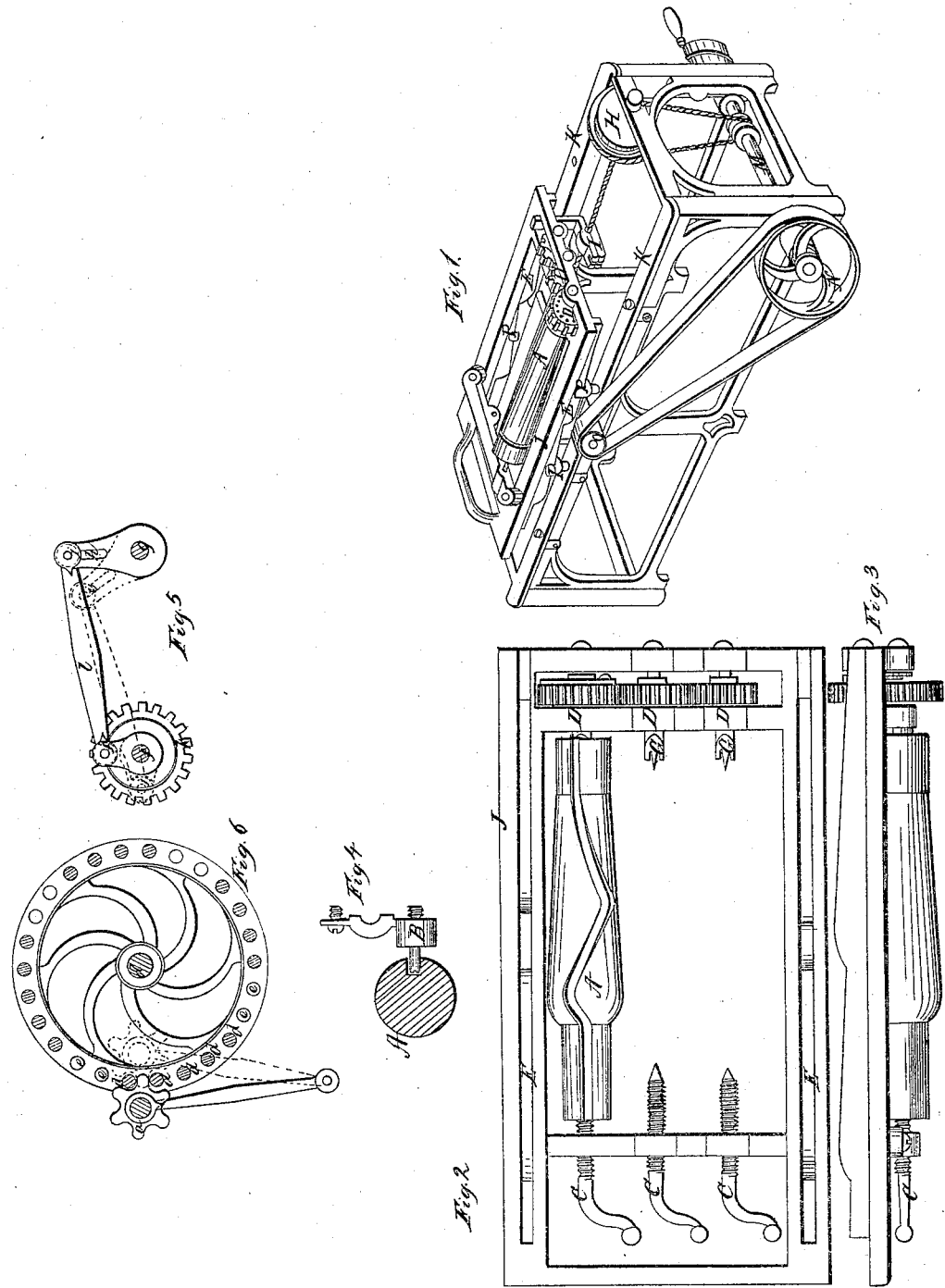
R. K. Huntoon,
Making Rope Molding.
Nº 22,400. Patented Dec. 21, 1858.

REUBEN K. HUNTOON, OF CONCORD, NEW HAMPSHIRE, ASSIGNOR TO HIMSELF AND JACOB B. RAND, OF SAME PLACE.

MACHINE FOR TURNING TAPERING TWISTS ON WOOD.

Specification of Letters Patent No. 22,400, dated December 21, 1858.

*To all whom it may concern:*

Be it known that I, REUBEN K. HUNTOON, of Concord, in the county of Merrimack and State of New Hampshire, have invented a new and useful Machine for Planing Regular and Graduated Twists of any Size and Shape, which I call the "Regular-Twist-Planing Machine;" and I do hereby declare that the following is a full and exact description of the construction and operation of the same, reference being had to the annexed drawings, making a part of this specification, in which—

Figure 1 is a perspective view; Fig. 2 is an inverted view of carriage; Fig. 3 is a lateral view of the carriage; Fig. 4 is a view showing a section of the cylinder A through A, A; also, a view of the guiding pin and box, that attaches to the main frame; Fig. 5 is a view of a pair of cranks united by a connecting rod one of which is adjustable, and the other fixed; Fig. 6 is a pair of gears.

A represents a cylinder; B is a guiding pin over which the grooves in cylinder A passes; C, C, C, are tail dogs; D, D, D the gears attached to the head dogs.

E, E, is a slide attached to the carriage; G, G, G, are the head dogs.

H is the pulley attached to the screw which feeds the carriage; K, K, is the main frame.

L, L, is the loose and tight pulleys; M, is the counter shaft; N, the counter pulley at the end of the shaft; O is the pulley attached to the counter shaft.

P, P, P, P, is the adjustable standards to rise and fall the carriage; I, is a hinge nut; J, J, is the carriage.

To enable others skilled in the art to make and use my invention, I will proceed to describe its construction and operation.

I make a cylinder in which is to be a groove of the general outline of the twist to be planed. This groove passes over the guiding pin B by means of which the index gear, attached to the cylinder, is revolved, which also causes the connecting gear to revolve in like manner. Through this connecting gear passes the head dogs, to which is attached the pieces to be planed. These are firmly secured in the carriage by means of the head and tail dogs. The carriage is fed by a screw, which is turned by a belt, connecting with the counter shaft. To this screw is attached an adjustable hinge nut, which opens at any given point, by means of which the feed of the carriage is stopped. Different sizes of twist may be planed by raising or lowering the carriage, by means of the adjustable standards P, P, and by raising or lowering either end of the carriage, by the same means, a twist of any desirable taper may be planed. The cutters are attached to the cutter shaft in sets, which may be varied in number, according to the number of pieces to be planed at one and the same time.

Instead of the grooved cylinder A, with its accompanying gears, the pair of cranks and gears represented in Figs. 5 and 6 may either be substituted in place of it, as the principles of operation are the same, though they are no part of the machine represented by the model. I offer them only as showing the different modes in which the principles of this machine may be applied to accomplish the same results.

In Fig. 6 $a$, $a$ represents a pinion; $b$, is a mangled gear; $b$, $b$, $b$, represents the teeth in the mangled gear; $e$, $e$, represent the spaces with the teeth removed. By removing the teeth as represented at $e$, $e$, the pinion will roll around $d$, $d$, passing through the spaces $e$, $e$, into the position represented by the dotted lines; thence rolling around $d$ $d$ again, upon the inside, passing through the spaces $c$ $c$, and so revolving around and around, producing a forward and counter movement of the gears. It is evident that by removing any number of the teeth, less than the whole, any regular zigzag twist may be planed, and by filling all the spaces, the gears would make complete revolutions, forming a spiral twist.

In Fig. 5, $f$ represents the short crank, $g$, the adjustable crank, $h$, is a slot in the long crank; $i$ $i$, is the wrists of the short crank, $k$ is the gear, and $l$ $l$ the connecting rod. The short crank is fixed, and the adjustable crank is lengthened or shortened by means of the slot $h$. When the long crank is adjusted to the same length as the short one, they both will perform complete revolutions, but as their length becomes unequal, a forward and counter movement of the long crank is produced, which causes a like movement in the gear to which it is attached. It is evident that the zigzag nature of the twist will be determined by the length of the adjustable crank.

My machine differs materially from what is usually termed an automatic turning lathe for turning irregular forms, such as gunstocks, or lasts, for with my machine, I make regular forms with twisted or helical faces or surfaces, the machine being peculiarly adapted to the manufacture of pianoforte legs, or table or chair legs. While I adopt in my said machine or apply to its movable carriage, J, the longitudinal guides, E, for the purpose of regulating the vertical movements of such carriage during its longitudinal movements, I adopt in combination therewith and the driving and stock mandrels and their gears, a twist groove block A, formed with a groove running helically and longitudinally through it and made to work on a stationary stud, B, as described. And furthermore, I so apply the rests or supports P, P, of the guides, E, E, to the frame A as to enable each of them or each two of them to be adjusted or changed in height and afterward fixed in position. This is accomplished by having each guide move freely up and down in the frame A, and to be fixed therein by a set screw. Furthermore, the driving gear, D, which is placed on the mandrel of the twist block A, is applied thereto so as to be capable of being freely turned thereon. It has a series of holes or notches made around in it as shown in Fig. 1, and at equal distances apart, such holes operating in connection with a spring latch or catch, $x$, (see Fig. 2,) applied to the circular plate $y$, which is arranged on the mandrel. The said spring catch by entering either of the holes clutches the gear to the mandrel. By such means the gear may be set free from the shaft or mandrel and turned thereon, so as to partially rotate the stock mandrels in order to bring their blocks of wood into new positions transversely, preparatory to the cutting of each twisted face thereof.

I do not claim the invention of pattern guides, E, E, applied to a moving carriage, J, and irrespectively of a rotary twist block and the mechanism connecting the same with the stock mandrels or arbors. Nor do I claim stationary rests for the carriage guides E, E, to move on, but What I do claim is—

The arrangement of the several separate devices described, when operated as set forth for turning irregular tapering forms of wood.

REUBEN K. HUNTOON.

Witnesses:
LYMAN K. HALL,
FIFIELD TUCKER.